(12) United States Patent
Orcutt

(10) Patent No.: US 8,522,928 B2
(45) Date of Patent: Sep. 3, 2013

(54) BRAKING APPARATUS FOR A SKATEBOARD

(76) Inventor: Douglas Orcutt, Lagunitas, CA (US)

(*) Notice: Subject to any disclaimer, the term of this patent is extended or adjusted under 35 U.S.C. 154(b) by 324 days.

(21) Appl. No.: 12/484,144

(22) Filed: Jun. 12, 2009

(65) Prior Publication Data

US 2010/0314204 A1 Dec. 16, 2010

(51) Int. Cl.
B60T 1/14 (2006.01)
B62M 1/00 (2010.01)

(52) U.S. Cl.
USPC .......................................... 188/5; 280/87.042

(58) Field of Classification Search
USPC ............. 280/87.041, 87.042, 11.215, 11.216; 188/5
See application file for complete search history.

(56) References Cited

U.S. PATENT DOCUMENTS

| 4,037,852 | A | * | 7/1977 | Bayer et al. ............... 280/87.042 |
| 4,043,566 | A | | 8/1977 | Johnson |
| 4,054,296 | A | | 10/1977 | Sullins |
| 4,088,334 | A | | 5/1978 | Johnson |
| 4,099,734 | A | | 7/1978 | Lowery |
| 4,167,225 | A | | 9/1979 | Fragoso |
| 4,168,076 | A | | 9/1979 | Johnson |
| 4,288,088 | A | | 9/1981 | Harrison |
| 5,397,137 | A | | 3/1995 | Pellegrini |
| 6,035,976 | A | | 3/2000 | Duhamel |
| 6,367,828 | B1 | | 4/2002 | Mandic |

* cited by examiner

Primary Examiner — Robert A Siconolfi
Assistant Examiner — Stephen Bowes
(74) Attorney, Agent, or Firm — Haynes and Boone LLP

(57) ABSTRACT

A skateboard braking apparatus comprising a brake actuator having a lever extending above the skateboard and a contact portion extending below the skateboard. The brake actuator is pivotably connected to the rear end of the skateboard at a connection point on the brake actuator such that when a user applies a rearward force on a forward facing face of the lever portion of the brake actuator, the brake actuator pivots about the connection point so that the contact portion makes contact with a surface on which the skateboard travels.

12 Claims, 4 Drawing Sheets

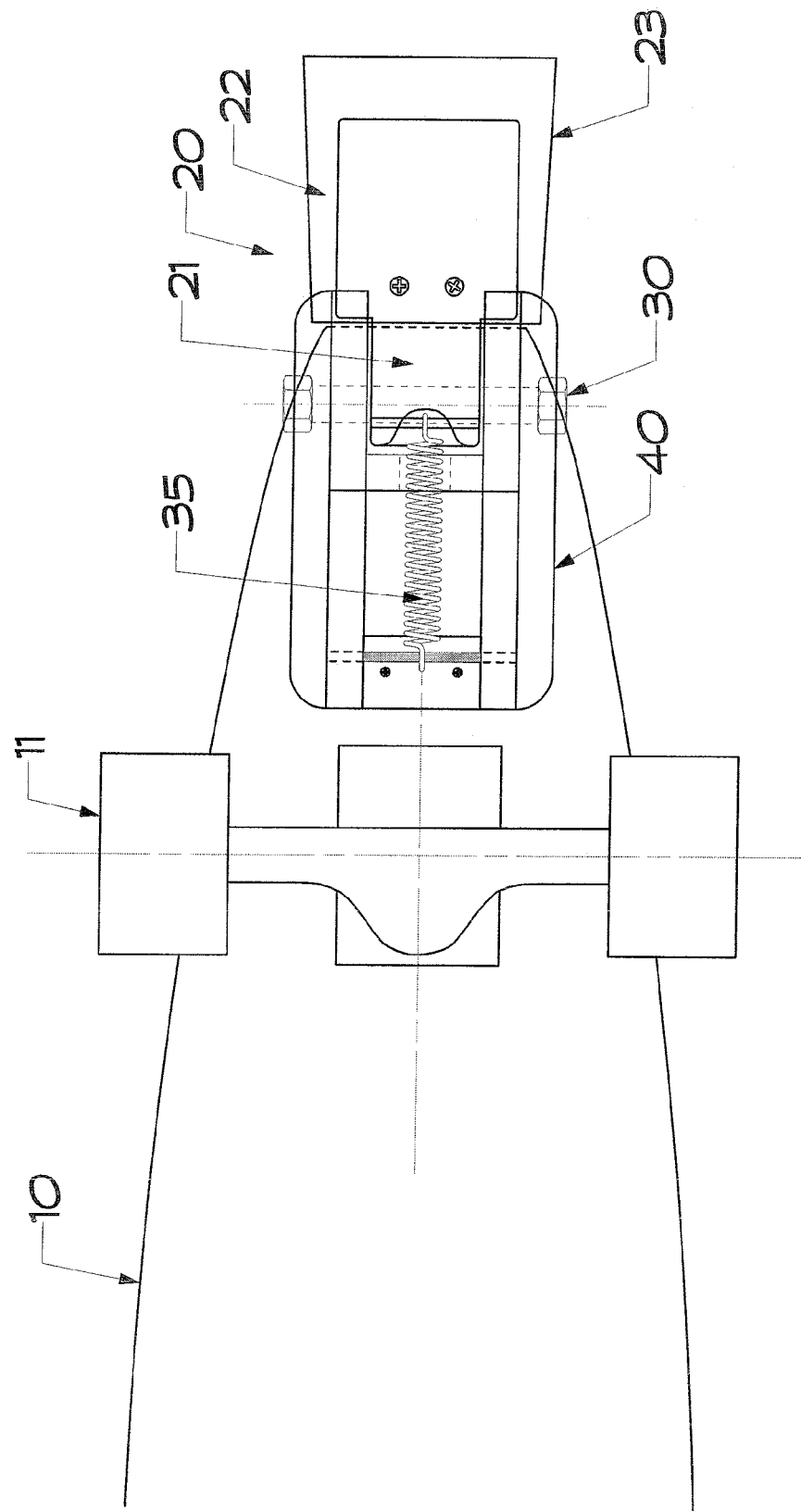

BRAKING APPARATUS FOR A SKATEBOARD

FIELD OF THE INVENTION

This invention relates to a braking apparatus for a skateboard.

BACKGROUND OF THE INVENTION

Wheeled boards such as a skateboard are widely used for recreation and transportation. While a skateboard user may often desire to slow down or stop the skateboard, conventional skateboards do not have any braking apparatus. A user would brake by lowering one foot to the ground or would tilt the entire skateboard to cause a portion of the skateboard to scrape the pavement. Both methods require a certain amount of skill and experience. The scraping method also causes damage to the skateboard. Such rigorous movements are especially undesirable when the skateboard is used as a means of transportation.

Various attempts have been made to devise a brake to assist the slowing down or stopping of a skateboard. One type of brakes is the wheel brake, in which the brake system reduces the rotational speed of the wheel. However, skidding is a common problem with a wheel brake, and the wheel brake also considerably increases the rate of wear on the wheels. Another brake is the of friction brake in which a braking device is lowered to contact the pavement to create friction between the braking device and the pavement. For example, U.S. Pat. Nos. 4,167,225, 6,035,976, 4,168,076, 4,043,566, 4,054,296, 4,088,334, and 4,099,734 each disclose an apparatus for braking a skateboard friction. However, the known friction brakes generally require the user to lift up one foot or otherwise significantly shift his balance to engage the brake. The maneuver can cause the user to loose balance. Therefore, existing braking devices for skateboarding have been unsatisfactory.

SUMMARY

According to one aspect, the invention provides a braking apparatus for a skateboard. The braking apparatus comprises a brake actuator having a lever extending above the skateboard and a contact portion extending below the skateboard. The brake actuator is pivotably connected to the rear end of the skateboard at a connection point on the brake actuator such that when a user applies a rearward force on a forward facing face of the lever portion of the brake actuator, the brake actuator pivots about the connection point so that the contact portion makes contact with a surface on which the skateboard travels.

Other features and aspects of the invention will become apparent from the following detailed description, taken in conjunction with the accompanying drawings which illustrate, by way of example, the features in accordance with embodiments of the invention. The summary is not intended to limit the scope of the invention, which is defined solely by the claims attached thereto.

DESCRIPTION OF THE DRAWINGS

FIG. 3 shows a detailed bottom view of the braking apparatus 20 of FIG. 1.

DETAILED DESCRIPTION

The invention is described more fully hereinafter with reference to the accompanying drawings, in which embodiments of the invention are shown. This invention may, however, be embodied in many different forms and should not be construed as limited to the embodiments set forth herein.

Figure 1:
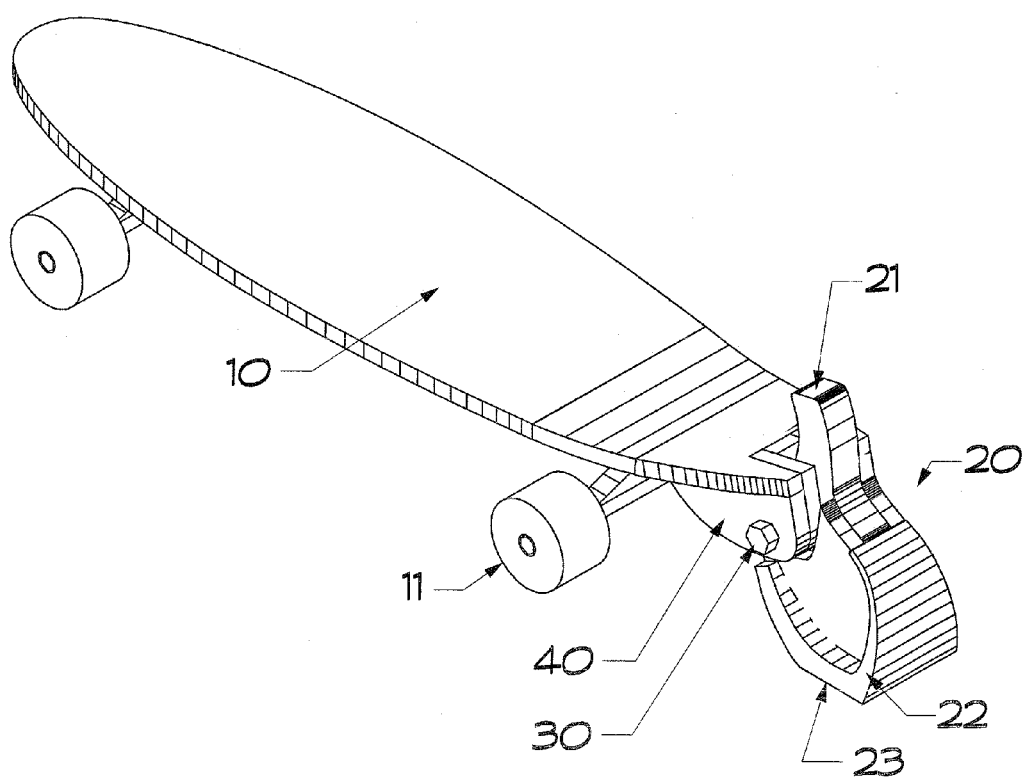
FIG. 1 is an perspective view of a skateboard having an exemplary braking apparatus according to an embodiment of the present invention.

FIG. 1 shows a skateboard 10 which includes wheels 11 and braking apparatus or actuator 20 attached to its rear end. The braking actuator 20 is connected to the skateboard 10 at a connection point 30. The brake actuator includes a lever portion 21 and a contact portion 22. The lever portion 21 extends substantially vertically above the skateboard and is generally narrower than the contact portion 22 which extends below the skateboard. The brake actuator 20 may be made of a durable material. The contact portion of the brake actuator 20 may also be covered by a brake pad 23. The brake pad 23 is replaceable to provide a long service life to the braking apparatus. The brake pad 23 is preferably made of rubber, for example. The large contact area on the bottom surface of the contact portion 22 helps to stabilize the skateboard while braking. The connection point 30 is shown in FIG. 1 to include a machine bolt. However, others types of commonly known connecting means which allows the brake actuator 20 to pivot may also be used to create the connection point 30. FIG. 1 also shows a brake housing 40 attached to the skate board 10. The brake housing 40 comprises an extension below or behind the skateboard on which the connection point 30 can be attached. The connection point 30 may be directly connected to the skateboard 10 or through the brake housing 30. The brake housing may also be formed as part of the skateboard 10.

Figure 2:
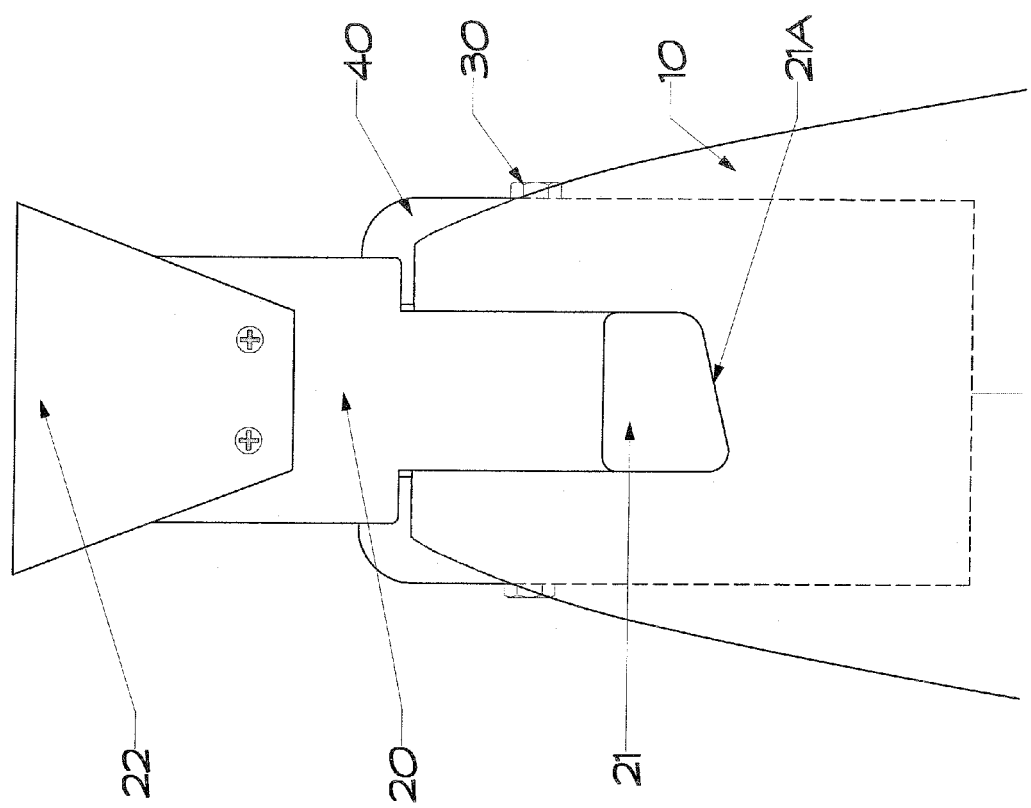
FIG. 2 shows a detailed top view of the braking apparatus 20 of FIG. 1.

FIG. 2 is a detailed top view of the braking apparatus 20 shown in FIG. 1. FIG. 2 shows the skateboard 10, the connection point 30, the brake housing 40, and the brake actuator 20 including the lever portion 21, and the contact portion 22. FIG. 2 also shows the lever portion 21 with an angled forward facing face 21A. The angle of the angled face 21A can be adjusted according to the user's riding preference (e.g. left foot forward or right foot forward). The angled face 21A can also be modified to follow the contour of the heel of the rear foot to allow both sideway and backward movements of the rear foot to engage the brake. The angled face 21A also gives the user greater control over the pressure applied on the brake for better speed control.

FIG. 3 is a detailed bottom view of the braking apparatus of FIG. 1. In additional to the features shown in FIGS. 1 and 2, FIG. 3 shows a spring 35 for keeping the brake actuator in a disengaged position (see also FIG. 4a) and a rubber brake pad 23. The spring 35 is connected between the brake actuator 20 and either the brake housing 40 or the skateboard 10. The spring 35 is shown to be an extension type spring connected between the lever portion 21 and the brake housing 40. Alternatively, the spring 35 maybe a compression type spring connected between the contact portion 23 and the skateboard 10 or the brake housing 40. Other commonly known means of providing elasticity, such as elastic polymers and flexible metal strips can also be used.

Figure 4A:
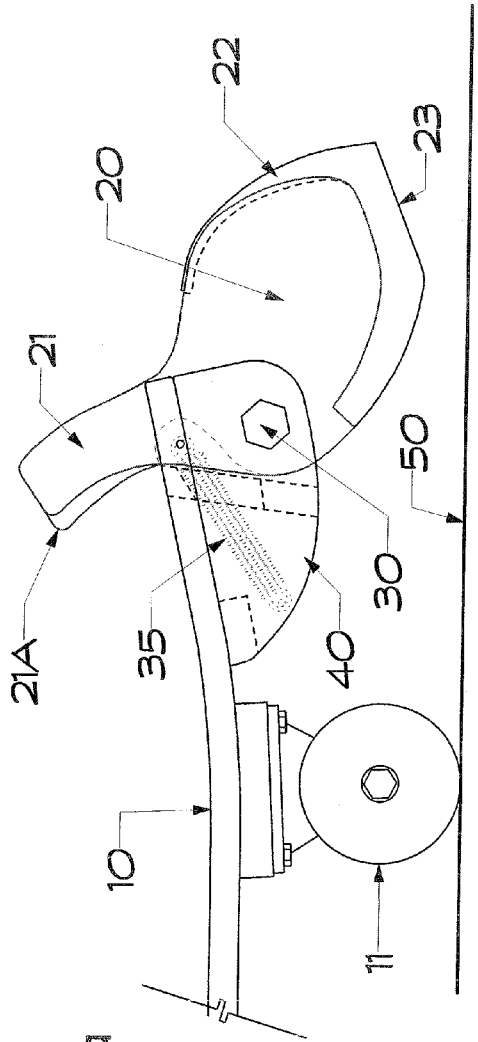
FIGS. 4a-b are detailed side views of the braking apparatus 20 of FIG. 1.
Figure 4B:
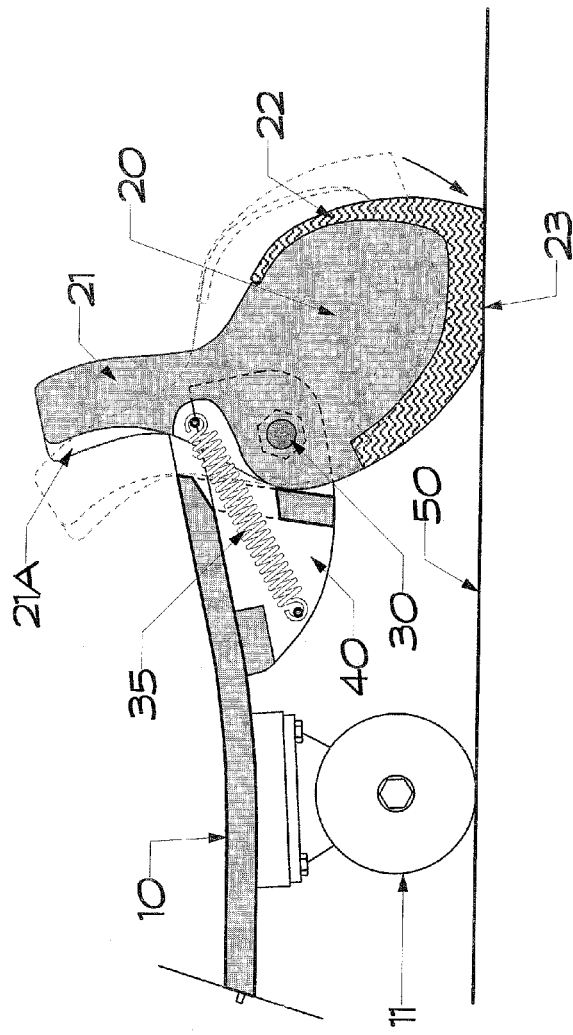

The operation of the braking apparatus is described below with reference to FIGS. 4a and b. FIGS. 4a and b show the braking apparatus 20 in disengaged and engaged positions respectively. When no force is exerted on the lever portion 21 of the brake actuator 20, the brake actuator 20 stays in a disengaged position as shown in FIG. 4a. The structure of the braking apparatus allows the user to engage the brake by sliding his foot backwards or sideways, without having to lift his foot off the skateboard or significantly shift his balance. When the user engages the brake by pushing on the lever portion 21 of the brake actuator, the spring 35 extends to allow the contact portion 22 to pivot forward and contact a surface 50 on which the skateboard travels. The friction between the contact portion 22 and the surface 50 reduces the speed of the skateboard. When the backward pressure on the lever portion 21 is released, the spring 35 brings the brake actuator 20 back into the disengaged position and allows the skateboard 10 to travel unhindered.

Embodiments of the present invention may provide various advantages not found in conventional skateboards, including skateboards with braking devices. First, the user is given much more control over the speed of the skateboard without compromise to the balance and stability of the user. On a conventional skateboard, the user either has to brake with his foot, or scrape the board to reduce the speed of the board. Existing skateboard brakes such as those shown in U.S. Pat. Nos. 4,167,225 and 4,043,556 require a step-down motion that could also affect the balance the board and potentially cause the board to tilt unintentionally. In contrast, the present embodiment allows the user to slide his foot to engage the brake, while maintaining optimal balance on the board. In an embodiment of the present invention having an angled face 21A on the lever portion, the user is able to engage the brake by sliding his foot sideways or backward requiring only minimal foot movement and balance shifting. Further, control of brake pressure is accomplished by a pivot action of the rearward foot, without any transfer of weight from one foot to the other.

Second, large contact surface on the contact portion 22 provides further stability during braking.

Third, friction brakes reduce the cost of maintenance required by foot brake, scrape brake, and wheel brake methods. In an embodiment having the brake pad 23, the cost of operation is further reduced. The relatively large size of the contact portion also increases the brake apparatus' durability.

Fourth, the simplicity of embodiments of the present invention allows the apparatus to be installed on existing skateboard without significant modification to the skateboard body.

While the invention has been described in terms of particular embodiments and illustrative figures, those of ordinary skill in the art will recognize that the invention is not limited to the embodiments or figures described.

The description is not intended to be exhaustive or to limit the invention to the precise form disclosed. It should be understood that the invention can be practiced with modification and alteration and that the invention be limited only by the claims and the equivalents thereof.

What is claimed is:

1. A braking apparatus for a skateboard board with a front end and a rear end comprising:
   a brake actuator attached to the skateboard, the brake actuator having a lever portion extending above the skateboard and a contact portion extending below the skateboard; wherein the brake actuator is connected to the rear end of the skateboard at a connection point on the brake actuator such that when a user applies a rearward force on a forward facing face of the lever portion of the brake actuator, the forward facing face being laterally angled relative to the direction of travel, the brake actuator pivots about the connection point so that the contact portion makes contact with a surface on which the skateboard travels.

2. The braking apparatus of claim 1 wherein the braking apparatus further comprises a brake housing provided between the brake actuator and the rear end of the skateboard.

3. The braking apparatus of claim 1 wherein the braking apparatus further comprises a bolt which connects the brake to the skateboard at the connection point.

4. The braking apparatus of claim 1 wherein the braking apparatus further comprises a tension device which restores the brake actuator to a pre-determined position when no rearward force is applied on the forward facing face of the lever portion of the brake actuator.

5. The braking apparatus of claim 4, wherein the tension device comprise a spring.

6. The braking apparatus of claim 1 wherein the contact portion has a contact surface that is covered by a brake pad.

7. A skateboard, comprising:
   a board having a substantially flat surface with a front end and a rear end;
   a plurality of wheels provided underneath the board to allow the skateboard to travel under control of a user;
   a brake actuator attached to the board having a lever portion with a forward facing face and a contact portion, the lever portion extending above the board and the contact portion extending below the board; wherein the brake actuator is connected to the rear end of the board at a connection point such that when the user applies a rearward force on the forward facing face of the lever portion of the brake actuator, the brake actuator pivots about the connection point so that the contact portion makes contact with a surface on which the skateboard travels, and wherein the forward facing face of the lever portion is laterally angled relative to the direction of travel.

8. The skateboard of claim 7 further comprising a brake housing provided between the brake actuator and the rear end of the skateboard.

9. The skateboard of claim 7 further comprising a bolt which connects the brake actuator to the board at the connection point.

10. The skateboard of claim 7 wherein the brake actuator further comprises a tension device which restores the brake actuator to a pre-determined position when no rearward force is applied on the forward facing face of the lever portion of the brake actuator.

11. The skateboard of claim 10, wherein the tension device comprises a spring.

12. The skateboard of claim 7 wherein the contact portion has a contact surface that is covered by a brake pad.

* * * * *